United States Patent
Miller et al.

(10) Patent No.: US 10,146,551 B2
(45) Date of Patent: Dec. 4, 2018

(54) INITIALIZING AND RECONFIGURING REPLACEMENT MOTHERBOARDS

(71) Applicant: Dell Products, L.P., Round Rock, TX (US)

(72) Inventors: Xiaomei Miller, Round Rock, TX (US); Allen Wynn, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 162 days.

(21) Appl. No.: 15/248,058

(22) Filed: Aug. 26, 2016

(65) Prior Publication Data

US 2018/0060079 A1     Mar. 1, 2018

(51) Int. Cl.
*G06F 8/65* (2018.01)
*G06F 9/4401* (2018.01)

(52) U.S. Cl.
CPC ........... *G06F 9/4403* (2013.01); *G06F 8/65* (2013.01)

(58) Field of Classification Search
CPC ................................. G06F 8/65; G06F 9/4403
See application file for complete search history.

(56) References Cited

U.S. PATENT DOCUMENTS

| | | | | |
|---|---|---|---|---|
| 2009/0177999 A1* | 7/2009 | Martinez | ................... | G06F 8/61 715/810 |
| 2014/0122857 A1* | 5/2014 | Wall | ..................... | G06F 9/4403 713/2 |
| 2017/0131992 A1* | 5/2017 | Lee-Baron | ................ | G06F 8/65 |
| 2017/0220355 A1* | 8/2017 | Huang | .................. | G06F 9/3842 |

* cited by examiner

*Primary Examiner* — Albert Wang
(74) *Attorney, Agent, or Firm* — Fogarty LLP

(57) ABSTRACT

Systems and methods for initializing and reconfiguring replacement motherboards are described. In some embodiments, an Information Handling System (IHS) may include: a motherboard, a processor mounted on the motherboard, and a Basic Input/Output System (BIOS) mounted on the motherboard and coupled to the processor, the BIOS having program instructions stored thereon that, upon execution by the processor, cause the IHS to: determine, while operating in a service mode, whether prefill data is available in a memory device distinct from any component mounted on the motherboard, where the prefill data is usable by the BIOS to automatically fill out at least a portion of a service menu provided by the BIOS; validate the prefill data; and in response to the validated, prefill data having changed since a previous booting of the IHS, store updated prefill data in the memory device.

19 Claims, 4 Drawing Sheets

INITIALIZING AND RECONFIGURING REPLACEMENT MOTHERBOARDS

FIELD

This disclosure relates generally to Information Handling Systems (IHSs), and more specifically, to systems and methods for initializing and reconfiguring replacement motherboards.

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Most IHSs include one or more motherboards. A motherboard may be any printed circuit board containing components (e.g., Central Processing Unit(s) and memory) of an IHS, computer, or other device, with connectors into which other circuit boards can be slotted.

When a service technician replaces a motherboard in the field or repair hub, the new motherboard (e.g., from stock) may be initialized with certain information such as, for example, a service tag, a stock keeping unit (SKU), etc. To this end, upon deployment, a motherboard may be set in Service Menu Manufacturing Mode ("service mode") such that the IHS's Basic Input/Output System (BIOS) will initially boot them to a service menu, and the service technician is prompted to enter all required information.

As the inventors hereof have recognized, however, this is a manual process that takes time and is subject to human error. At times the IHS's service tag is printed on a sticker, which may be old, worn, and/or hard to read. Also, the service technician may enter the wrong service tag or SKU into the service menu, requiring the customer to return the IHS for repairs. Moreover, the service technician must ensure that BIOS setup options are set correctly, and that boot options are added. Sometimes, a service technician has to use trial-and-error techniques to find the right setup (e.g., Legacy vs. UEFI boot mode, Secure-Boot-On, AHCI vs. RAID mode) and boot options (especially in the case of multiple operating systems installed, desire to have CD/floppy/etc. in the boot list or not, etc.).

SUMMARY

Embodiments of systems and methods for initializing and reconfiguring replacement motherboards are described herein.

In an illustrative, non-limiting embodiment, an Information Handling System (IHS) may include: a motherboard, a processor mounted on the motherboard, and a Basic Input/Output System (BIOS) mounted on the motherboard and coupled to the processor, the BIOS having program instructions stored thereon that, upon execution by the processor, cause the IHS to: determine, while operating in a service mode, whether prefill data is available in a memory device distinct from any component mounted on the motherboard, where the prefill data is usable by the BIOS to automatically fill out at least a portion of a service menu provided by the BIOS; validate the prefill data; and in response to the validated, prefill data having changed since a previous booting of the IHS, store updated prefill data in the memory device.

In some cases, the memory device may include a hard disk drive coupled to the motherboard. In other cases, the memory device may be mounted on a circuit board coupled to the motherboard.

The prefill data may include system identification information and configuration data. The configuration data may include at least one of: Management Engine (ME) stock keeping unit (SKU) selection, Platform Controller Hub (PCH) SKU selection, customer purchase selections, and BIOS Setup Information.

To validate the prefill data, the program instructions, upon execution by the processor, may further cause the IHS to: compare a system ID of the motherboard with a system ID stored as part of the prefill data in the memory device, compare an Extended Display Identification Data (EDID) serial number with an EDID serial number stored as part of the prefill data in the memory device, compare power supply identification information with power supply identification information stored as part of the prefill data in the memory device, and/or compare a dual in-line memory module (DIMM) serial number with a DIMM serial number stored as part of the prefill data in the memory device.

In another illustrative, non-limiting embodiment, a BIOS may have program instructions stored thereon that, upon execution by a processor of an IHS, cause the IHS to: enter a BIOS service menu while operating in a service mode; retrieve prefill data available in a memory device distinct from any component mounted on a motherboard to which the BIOS is mounted; validate the prefill data; and use the validated prefill data to automatically enter data into corresponding fields of the service menu.

In some cases, the program instructions, upon execution by the processor, further cause the IHS to allow a user to manually change the automatically entered data; determine that the prefill data is available in two or more memory devices distinct from any component mounted on the motherboard; and/or select one of the two or more memory devices to retrieve the prefill data from based upon a priority score. In some cases, the priority score may be based upon: (i) a speed of a data transfer between each of the two or more memory devices and the processor; (ii) a previous successful boot indication associated with the prefill data in each of the two or more memory devices; or (iii) a modification date associated with the prefill data in each of the two or more memory devices.

In yet another illustrative, non-limiting embodiment, a method may include: entering a BIOS service menu while operating in a service mode; retrieving prefill data available in a memory device distinct from any component mounted on a motherboard to which the BIOS is mounted; validating the prefill data; and using the validated prefill data to automatically enter data into corresponding fields of the service menu.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
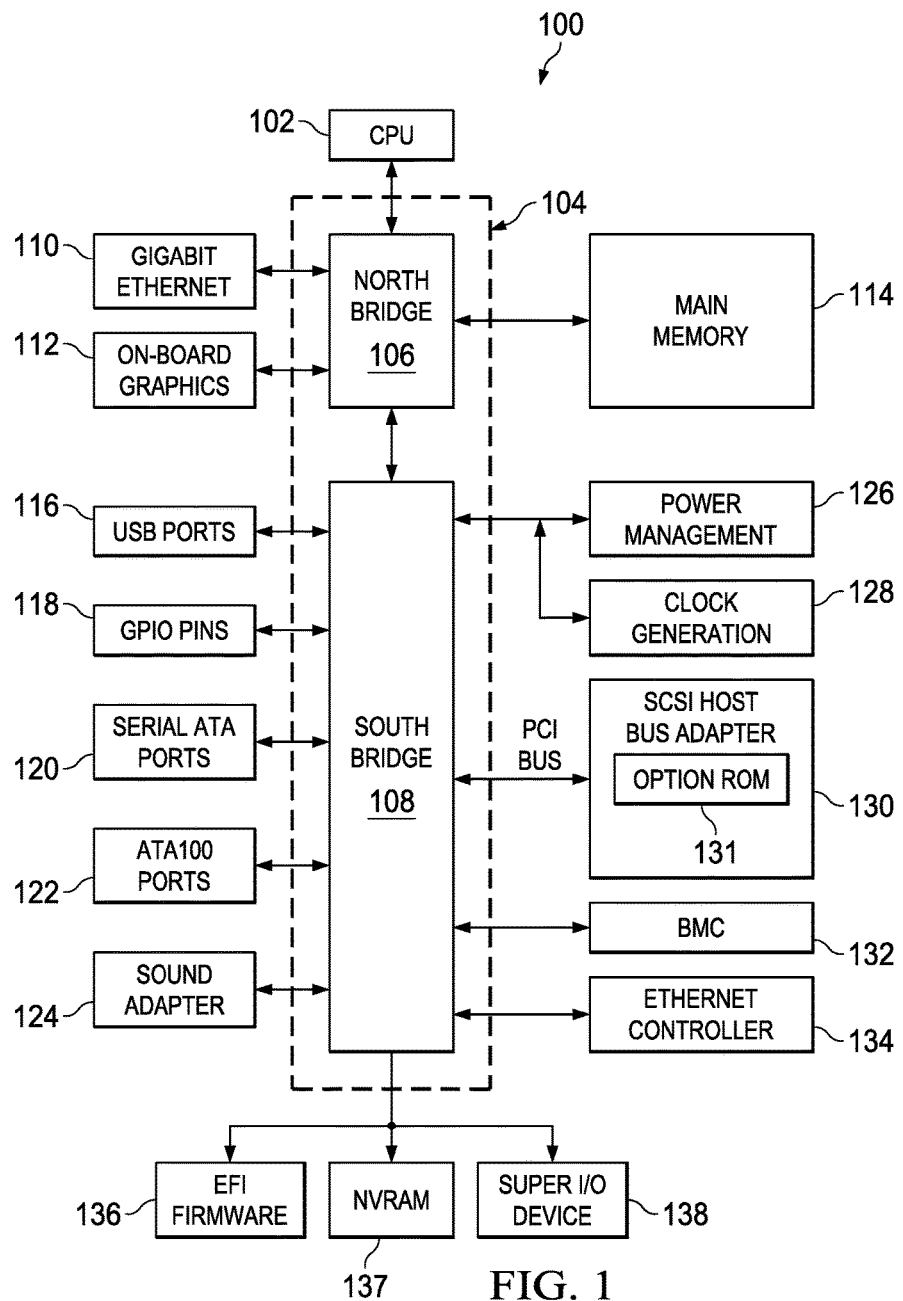
FIG. 1 is a block diagram of an example of an Information Handling System (IHS) configured to implement systems and methods according to some embodiments.

In various embodiments, the systems and methods described herein may facilitate initialization and reconfiguration of replacement motherboards. These techniques may reduce or eliminate the manual-entry and guesswork from the motherboard replacement process, when possible, so that the process is faster and less error-prone. In some cases, these techniques may involve having an Information Handling System's (IHS's) Basic Input/Output System (BIOS) store service menu prefill information ("prefill data") on the IHS's Hard Disk Drive (HDD). Examples of HDD drives include magnetic and/or solid state drives (SSDs). Additionally or alternatively, the IHS may store prefill data on other non-motherboard storage media or device available to the IHS.

Later, the IHS may retrieve the prefill data when needed for a new, replacement motherboard. For example, prefill data may be stored on a Unified Extensible Firmware (EFI) system partition or the like.

During a Power-On Self Test (POST), the BIOS checks for the existence of prefill data on the HDD. If the information is present, the BIOS validates it. If the data does not exist, does not pass validation, or does not match the current information, then the BIOS writes the correct, updated prefill data onto the HDD.

When the service technician replaces a motherboard, the BIOS boots to a service menu. The BIOS then looks for the prefill data. If the information is present and passes validation, the BIOS pre-fills the corresponding fields in the service menu for the service technician and restores the configuration data (BIOS setup settings and boot options).

The service technician may visually inspect the service menu information to make sure it is correct, then click OK/Accept. Additionally or alternatively, the data may be automatically accepted. If the prefill data is not present or does not pass validation, then the service technician manually enters the data and sets the BIOS setup settings and boot options so that the IHS is in a bootable state.

To make sure that the prefill data is correct for a specific IHS, the BIOS may validate it against constant or non-changing system-specific values. Additionally or alternatively, validation may occur against changing, non-system specific values. For example, Extended Display Identification Data (EDID) of an external monitor may change because the monitor used at a service hub may be different than the monitor used by the customer. Add-in cards also include changeable information, because they may not have been present in the IHS on the first boot with the new motherboard. Moreover, certain information on the motherboard may also change over time (e.g., MAC address of the LOM). Yet, using systems and methods described herein, any of these pieces of information may be used for validation purposes.

Additionally or alternatively, a 2-byte system ID may be used for each IHS. Additional mobile device or laptop-appropriate validation values may include an integrated display's EDID serial number. Desktop/Workstation-appropriate values may include power supply information (e.g., available via $I^2C$) and DIMM serial numbers (e.g., for non-soldered down memory). More generally, any unique identifier on a system component that is not part of the motherboard may be used.

Although the examples described herein refer specifically to computers and/or IHSs, it should be noted that the same principles may also be employed for any device that has storage media and where a replaceable board must be initialized upon service replacement, such as, for instance, cable-top boxes, phones, game consoles, telephony equipment, automotive computer equipment, etc.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

FIG. 1 shows an example of an IHS configured to implement the systems and methods described herein. It should be appreciated that although certain embodiments described herein may be discussed in the context of a desktop or server computer, other embodiments may be utilized with virtually any type of IHS. In this example, the IHS is configured to provide initialization and reconfiguration of replacement motherboards, as explained in more detail below.

Particularly, the IHS includes a baseboard or motherboard 100, which is a printed circuit board (PCB) to which components or devices are mounted to by way of a bus or other electrical communication path. For example, Central Processing Unit (CPU) 102 operates in conjunction with a chipset 104; CPU 102 is a processor that performs arithmetic and logical operations necessary for the functioning of the IHS.

Chipset 104 includes northbridge 106 and southbridge 108. Northbridge 106 provides an interface between CPU 102 and the remainder of the IHS. Northbridge 106 also provides an interface to a random access memory (RAM) used as main memory 114 in the IHS and, possibly, to on-board graphics adapter 112. Northbridge 106 may also be configured to provide networking operations through Ethernet adapter 110. Ethernet adapter 110 is capable of connecting the IHS to another IHS (e.g., a remotely located IHS) via a network. Connections which may be made by network adapter 110 may include local area network (LAN) or wide area network (WAN) connections. Northbridge 106 is also coupled to southbridge 108.

Southbridge 108 is responsible for controlling many of the input/output (I/O) operations of the IHS. In particular, southbridge 108 may provide one or more universal serial bus (USB) ports 116, sound adapter 124, Ethernet controller 134, and one or more general purpose input/output (GPIO) pins 118. Southbridge 108 may also provide a bus for interfacing peripheral card devices such as BIOS boot system-compliant SCSI host bus adapter 130. In some embodiments, the bus may include a peripheral component interconnect (PCI) bus. Southbridge 108 may also provide baseboard management controller (BMC) 132 for use in managing the various components of the IHS. Power management circuitry 126 and clock generation circuitry 128 may also be utilized during the operation of southbridge 108.

Additionally, southbridge 108 is configured to provide one or more interfaces for connecting mass storage devices to the IHS. For instance, in an embodiment, southbridge 108 may include a serial advanced technology attachment (SATA) adapter for providing one or more serial ATA ports 120 and/or an ATA100 adapter for providing one or more ATA100 ports 122. Serial ATA ports 120 and ATA100 ports 122 may be, in turn, connected to one or more mass storage devices storing an operating system (OS) and application programs. An OS comprises a set of programs that control operations of the IHS and allocation of resources. An application program is software that runs on top of the OS and uses computer resources made available through the OS to perform application specific tasks desired by the user.

Mass storage devices connected to southbridge 108 and SCSI host bus adapter 130, and their associated computer-readable media provide non-volatile storage for the IHS. Although the description of computer-readable media contained herein refers to a mass storage device, such as a hard disk or CD-ROM drive, it should be appreciated a person of ordinary skill in the art that computer-readable media can be any available media on any memory storage device that can be accessed by the IHS. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count (LPC) interface may also be provided by southbridge 108 for connecting Super I/O device 138. Super I/O device 138 is responsible for providing a number of I/O ports, including a keyboard port, a mouse port, a serial interface, a parallel port, and other types of input/output ports.

The LPC interface may connect a computer storage media such as a ROM or a flash memory such as a non-volatile random access memory (NVRAM) for storing BIOS/firmware 136 that includes BIOS program code containing the basic routines that help to start up the IHS and to transfer information between elements within the IHS. BIOS/firmware 136 comprises firmware compatible with the EFI Specification and Framework.

The LPC interface may also be utilized to connect NVRAM 137 to the IHS. NVRAM 137 may be utilized by BIOS/firmware 136 to store configuration data for the IHS. In other embodiments, configuration data for the IHS may be stored on the same NVRAM 137 as BIOS/firmware 136.

BMC 132 may include non-volatile memory having program instructions stored thereon that enable remote management of the IHS. For example, BMC 132 may enable a user to discover, configure, and manage the IHS, setup configuration options, resolve and administer hardware or software problems, etc. Additionally or alternatively, BMC 132 may include one or more firmware volumes, each volume having one or more firmware files used by the BIOS' firmware interface to initialize and test components of the IHS.

As a non-limiting example of BMC 132, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state, because iDRAC is embedded within the IHS from the factory.

It should be appreciated that, in other embodiments, the IHS may comprise other types of computing devices, including hand-held computers, embedded computer systems, personal digital assistants, and other types of computing devices. It is also contemplated that the IHS may not include all of the components shown in FIG. 1, may include other components that are not explicitly shown in FIG. 1, or may utilize a different architecture.

Figure 2:
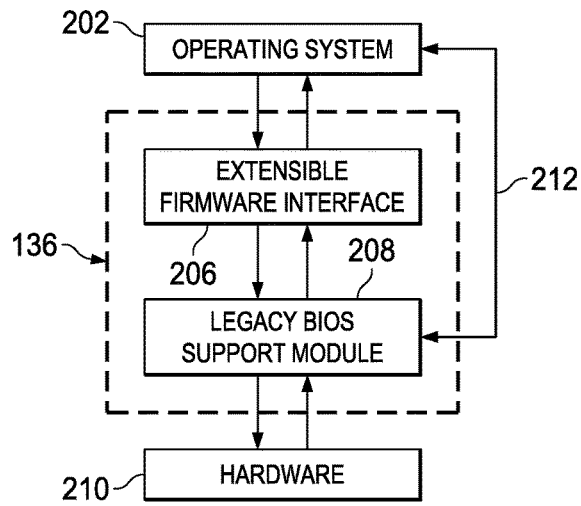
FIGS. 2 and 3 are block diagrams of examples of aspects of an Extensible Firmware Interface (EFI) environment utilized by systems and methods according to some embodiments.

Referring now to FIG. 2, examples of aspects of an EFI environment created by BIOS/firmware 136 of the IHS are described. As shown, BIOS/firmware 136 comprises firmware compatible with the EFI Specification from INTEL CORPORATION or from the UEFI FORUM. The EFI Specification describes an interface between OS 202 and BIOS/firmware 136. Particularly, the EFI Specification defines the interface that BIOS/firmware 136 implements and the interface that OS 202 may use in booting.

According to an implementation of EFI, both EFI 206 and legacy BIOS support module 208 may be present in BIOS/firmware 136. This allows the IHS to support both firmware interfaces. In order to provide this, interface 212 may be used by legacy OSs and applications. Additional details regarding the architecture and operation of the EFI 206 are provided below with respect to FIG. 3. Moreover, additional details regarding the operation and architecture of EFI can be found in the EFI Specification and Framework, which are available from INTEL CORPORATION.

Figure 3:
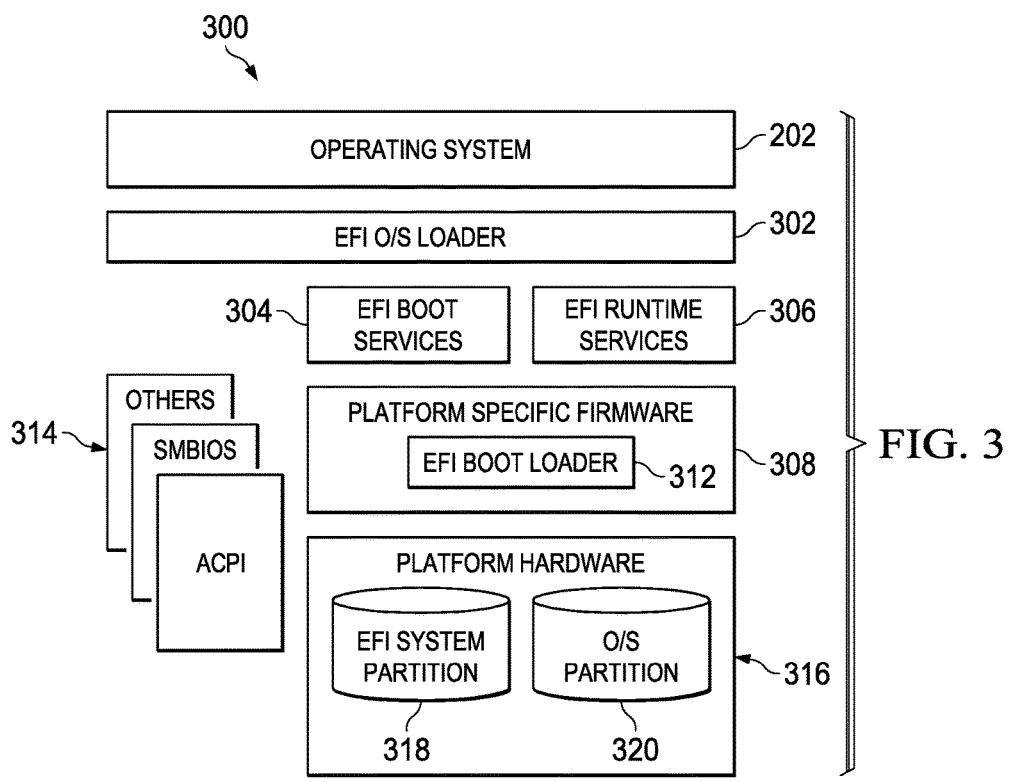

FIG. 3 provides additional details regarding an EFI Specification-compliant system 300 utilized to provide an operating environment for facilitate initialization and reconfiguration of replacement motherboards. As shown, system 300 includes platform hardware 316 and OS 202. Platform firmware 308 may retrieve an OS image from EFI system partition 318 using an EFI O/S loader 302. EFI system partition 318 may be an architecturally shareable system partition. As such, EFI system partition 318 defines a partition and file system that are designed to allow safe sharing of mass storage between multiple vendors. O/S partition 320 may also be utilized.

Once started, EFI O/S loader 302 continues to boot the complete OS 202. In doing so, EFI O/S loader 302 may use EFI boot services 304 and interface to other supported specifications to survey, comprehend, and initialize the various platform components and the operating system software that manages them. Thus, interfaces 314 from other specifications may also be present on system 300. For example, the Advanced Configuration and Power Management Interface (ACPI) and the System Management BIOS (SMBIOS) specifications may be supported.

EFI boot services 304 provide interfaces for devices and system functionality that can be used during boot time. EFI runtime services 306 may also be available to the O/S loader 302 during the boot phase. For example, a minimal set of runtime services may be presented to ensure appropriate abstraction of base platform hardware resources that may be needed by the operating system 202 during its normal operation. EFI allows extension of platform firmware by loading EFI driver and EFI application images which, when loaded, have access to all EFI-defined runtime and boot services.

Various program modules provide the boot and runtime services. These program modules may be loaded by the EFI boot loader 312 at system boot time. EFI boot loader 312 is a component in the EFI firmware that determines which program modules should be explicitly loaded and when. Once the EFI firmware is initialized, it passes control to boot loader 312. Boot loader 312 is then responsible for determining which of the program modules to load and in what order.

The various program modules executing within the EFI may have a need to receive user input or to display information on an output device, such as a display screen. In order to provide this functionality, BIOS/firmware 136 provides an HII database and an HII database driver that exposes methods for accessing the database through a HII database protocol interface. The HII database driver maintains the internal data structures for storing information in the HII database, and for providing access to input devices, forms, strings, and fonts stored in the HII database.

In many implementations, the aforementioned components of system 300 may be configured to provide a user with a service menu when a new motherboard is installed. In some cases, the new motherboard must be initialized with information such as, for example, a service tag, a stock keeping unit (SKU), etc. To that end, all of this information must be entered into BIOS/firmware 136 via the service menu.

With respect to various service menu items, a service tag includes a serial number that identifies the IHS to its OEM manufacturer. In some cases, the service tag may be used to provide technical support that is specific to that IHS. The service tag may also be used, for example, by BMC 132 to reach backend end servers and access software or support that is also particular to that IHS.

Meanwhile, SKUs may be used as follows. A CPU manufacturer, for example, may have a chip that has a super-set of features, and a technician may be permitted to select SKUs that "unlock" different subsets of features. This way the CPU manufacturer only has to build only one chip to hit several different price points.

The OEM manufacturer sets the SKU in the factory before shipping the IHS out to a customer, based on what the customer has ordered, and will then pay the CPU manufacturer for the appropriate SKU. For instance, the CPU manufacturer may provide a chip that supports multiple HDD modes (SCSI and SAS, or AHCI and RAID). SCSI and AHCI options may have lower price points, while SAS and RAID may have higher price points. If a customer orders a system with SCSI HDD (chipset that supports SCSI and SAS), the OEM factory sets the SKU to the SCSI SKU (as opposed to the SAS SKU), which disables SAS functionality, and reports to the CPU manufacturer that it shipped the SCSI PCH-SKU. Later, when the motherboard hosting that same CPU is replaced, the motherboard needs to again be set to SCSI (disabling the SAS support).

In sum, the service tag, SKU(s), and other configuration information are needed by BIOS/firmware 136 when motherboard 100 is replaced. This information is collectively referred to as "prefill data" to the extent it may be saved, retrieved, and automatically entered into the BIOS's service menu. In most cases, the prefill data includes both system identification information (e.g., service tag) and configuration information (e.g., Manageability Engine (ME) SKU selection, Platform Controller Hub (PCH) SKU selection, customer purchase selections, and BIOS setup information, including boot order, etc.). If this prefill data were stored in the very motherboard being replaced, it would be difficult to transfer that information back into a new, replacement new motherboard.

To address these and other problems, program instructions implementing system 300 for facilitating initialization and reconfiguration of replacement motherboards may be stored in BIOS/firmware 136. These instructions, upon execution by processor 102, cause the IHS to perform a number of operations described in more detail in connection with FIGS. 4 and 5.

Figure 4:
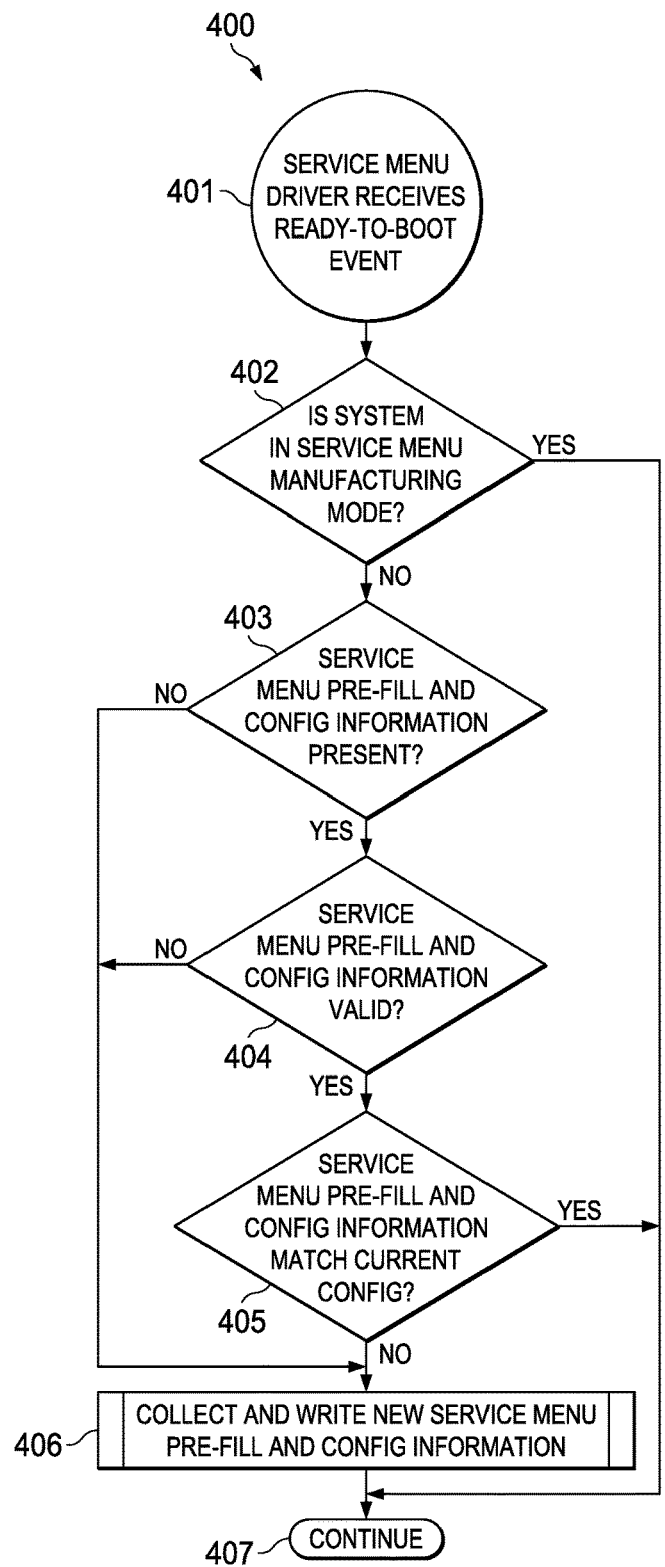
FIGS. 4 and 5 are flowcharts of examples of methods for saving and retrieving prefill data for initializing and reconfiguring replacement motherboards according to some embodiments.

FIG. 4 is a flowchart of an example of method 400 for saving service menu prefill data for initializing and reconfiguring replacement motherboards. In some implementations, method 400 may be performed through the execution of instructions stored in BIOS/firmware 136. At block 401, a service menu driver receives a ready-to-boot event. At block 402, method 400 determines whether the IHS is operating in service mode. If so, method 400 continues to block 407. Otherwise, at block 403, method 400 determines whether service menu prefill data is present in a memory device other than a device mounted on motherboard 100.

If so, block 404 determines whether the prefill data stored in the memory device is valid. In some cases, the memory device may be an HDD drive coupled to the motherboard, or it may be part of another circuit board coupled to the motherboard, for example, via a cable or slot. To validate the prefill data, the IHS may, for example, compare a system ID of the motherboard with a stored system ID, an Extended Display Identification Data (EDID) serial number with a stored EDID serial number, a dual in-line memory module (DIMM) serial number with a stored DIMM serial number, a power supply identification information with stored power supply identification information, etc.

If the prefill data is validated, block 405 determines whether the stored prefill data matches the current motherboard's configuration—that is, whether the prefill data has remained unchanged since a previous booting of the IHS. If so, method 400 continues to block 407.

Conversely, if block 403 determines that the prefill data is not present in any memory device that is not mounted directly on motherboard 100, if block 404 determines that the prefill data is not valid, and/or if block 405 determines that the prefill data does not match the current configuration, then block 406 collects and writes new prefill data to the memory device before continuing at block 407.

In various embodiments, block 406 may write the updated prefill data to two or more disparate memory devices outside of motherboard 100. For example, the prefill data may be stored in two or more HDDs, an HDD and a removable flash memory, a memory chip that is part of a video card or other circuit board slotted onto the motherboard, or any combination of any number of memory devices that are not directly mounted (e.g., via a CPU socket and/or soldered) on the motherboard.

In some embodiments, each memory device may receive a priority score based, for instance, upon characteristics such as: (i) a speed of a data transfer between each of the memory device and the processor; (ii) a previous successful boot indication associated with the prefill data in the memory device; and/or (iii) a modification date associated with the prefill data stored in the memory device.

As such, blocks 403-405 may also be performed with respect to the two or more memory devices. Particularly, block 403 may determine whether the prefill data is stored in each memory device, and so on. When the motherboard is replaced, the new BIOS may select one of the two or more memory devices to retrieve the prefill data from based upon the priority score, which may represent a quantifiable combination of previously mentioned characteristics.

For example, assume there is a first and a second memory devices available to the motherboard. For the first memory device, the speed of data transfer is 100/unit, the successful boot indication is 5 out of 5 attempts, and the modification date is today. For the second memory device, the speed of data transfer is 1000/unit, the successful boot indication is 2 out of 5 attempts, and the modification date is two months ago.

If the modification date were the most important variable (e.g., because the motherboard is determined to need the latest software or support available), the first memory device would be selected to provide prefill information because it has the latest updated data. If the modification date of the two memory devices were closer in time, the second memory device would be selected because of its higher speed. If predictability were more important, the first memory device would be selected because it has a 100% successful boot rate.

In some cases, a characteristic of the memory device usable in determining a priority score may include whether the device is removable from the IHS. For example, laptops have integrated displays such that any memory device coupled to the display's electronics (that is outside of the main motherboard) may be used. Desktops, however, have non-integrated displays, therefore although a memory device of a non-integrated display may be used, it may have a priority value lower than that of an integrated display. The higher the priority value, which may be computed based upon a user's behavior (e.g., how often the customer uses a particular display, adaptor, external HDD, etc.) and/or the IHS's usage history, the more reliable the prefill data associated with that memory device is.

More generally, each characteristic may be assigned a numerical priority value, and the aggregated priority score may be a number representing a selected weighed average of those values.

Figure 5:
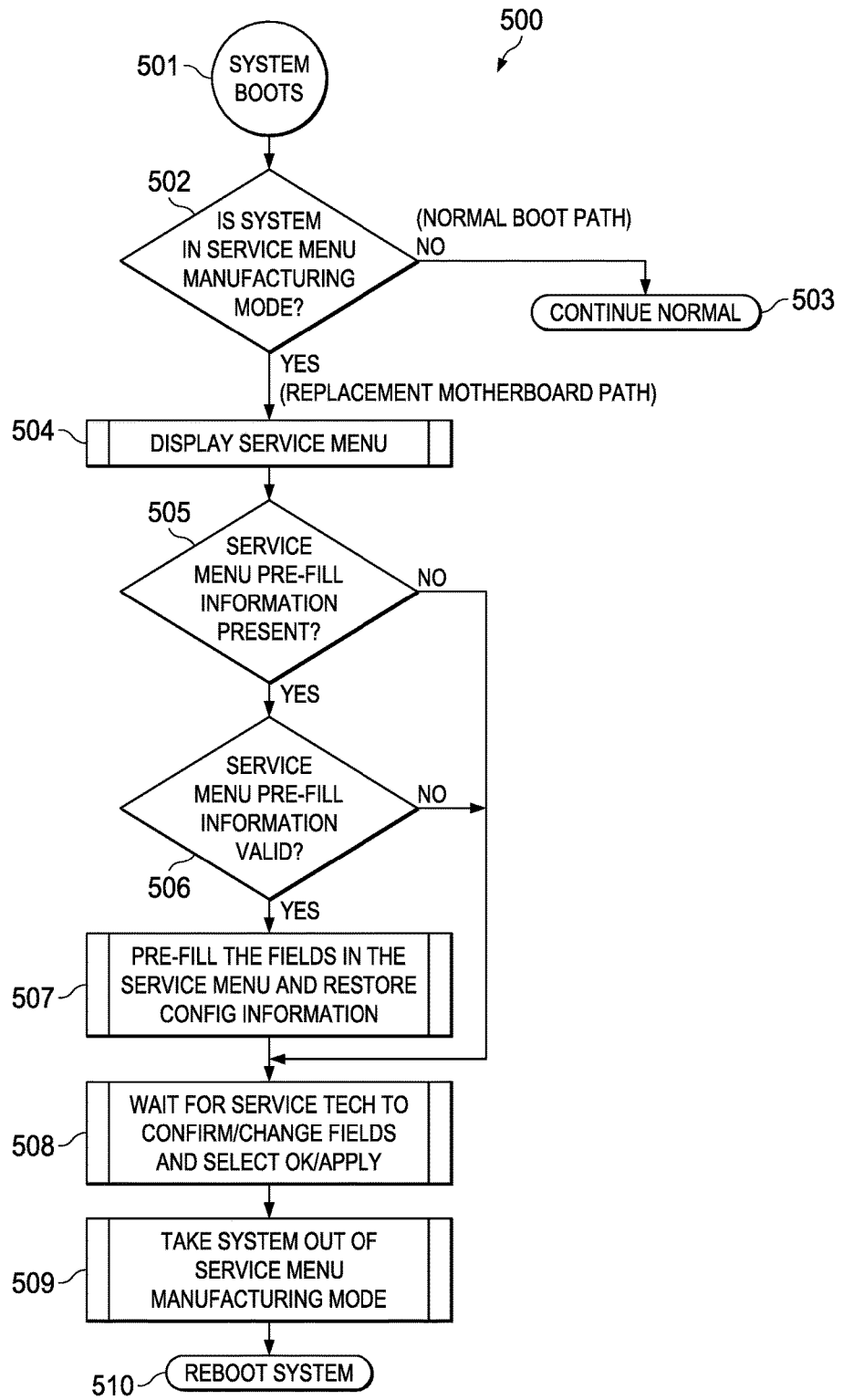

FIG. 5 is a flowchart of an example of a method for retrieving service menu prefill data for initializing and reconfiguring replacement motherboards. In some embodiments, method 500 may be performed through the execution of instructions stored in BIOS/firmware 136. At block 501, the IHS boots. At block 502, method 500 determines whether the IHS is in service mode. If not, block 503 follows the normal boot path.

At block 504, method 500 displays the service menu, for example, to a service technician. At block 505, method 500 determines if the menu prefill data is present in any of a plurality of one or more memory devices that are not mounted on the motherboard. If so, block 506 determines whether the prefill data is valid. If so, block 507 prefills the service menu and restore the IHS's configuration information using the prefill data.

If the prefill data is not present at block 505, or if the data is not valid at block 506, control passes to block 508. At block 508, method 500 waits for the service technician to confirm any manually entered changes to the prefill data. At block 509, method 500 takes the IHS out of service mode, and at block 510 method 500 reboots the IHS.

As noted above, at block 505 method 500 may also select a particular one of a plurality of memory devices from which to retrieve the prefill data. Again, each memory device and/or set of prefill data may be associated with a priority score or the like. Block 505 may automatically select the memory device based upon the score and/or may present an option for the service technician to select such a device.

In contrast with the foregoing, conventional systems have a BIOS setup page for entering the "Machine Type" and "Serial Number," requiring that the service technician first replace the motherboard, then boot and press a key sequence to enter BIOS setup to manually enter the serial number and adjust other setup option settings. This process is often missed. Meanwhile, the systems and methods described herein cannot be bypassed by the service technician. Moreover, the service menu may require that a service tag be entered before the system is allowed boot to setup or an Operating System.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a motherboard;
a processor mounted on the motherboard; and
a Basic Input/Output System (BIOS) mounted on the motherboard and coupled to the processor, the BIOS having program instructions stored thereon that, upon execution by the processor, cause the IHS to:
determine, while operating in a service mode, whether prefill data is available in a memory device distinct from any component mounted on the motherboard, wherein the prefill data is usable by the BIOS to automatically fill out at least a portion of a service menu provided by the BIOS;
validate the prefill data; and
in response to the validated, prefill data having changed since a previous booting of the IHS, store updated prefill data in the memory device.

2. The IHS of claim 1, wherein the memory device includes a hard disk drive coupled to the motherboard.

3. The IHS of claim 1, wherein the memory device is mounted on a circuit board coupled to the motherboard.

4. The IHS of claim 1, wherein the prefill data includes system identification information and configuration data.

5. The IHS of claim 4, wherein the configuration data includes at least one of: Management Engine (ME) stock keeping unit (SKU) selection, Platform Controller Hub (PCH) SKU selection, customer purchase selections, or BIOS Setup Information.

6. The IHS of claim 4, wherein to validate the prefill data, the program instructions, upon execution by the processor, further cause the IHS to compare a system ID of the motherboard with a system ID stored as part of the prefill data in the memory device.

7. The IHS of claim 4, wherein to validate the prefill data, the program instructions, upon execution by the processor, further cause the IHS to compare an Extended Display Identification Data (EDID) serial number with an EDID serial number stored as part of the prefill data in the memory device.

8. The IHS of claim 4, wherein to validate the prefill data, the program instructions, upon execution by the processor, further cause the IHS to compare power supply identification information with power supply identification information stored as part of the prefill data in the memory device.

9. The IHS of claim 4, wherein to validate the prefill data, the program instructions, upon execution by the processor, further cause the IHS to compare a dual in-line memory module (DIMM) serial number with a DIMM serial number stored as part of the prefill data in the memory device.

10. A Basic I/O System (BIOS) having program instructions stored thereon that, upon execution by a processor of an Information Handling System (IHS), cause the IHS to:
enter a BIOS service menu while operating in a service mode;
determine that prefill data is available in two or more memory devices;
retrieve the prefill data from a selected one of the two or more memory devices;
validate the prefill data; and
use the validated prefill data to automatically enter data into corresponding fields of the service menu.

11. The BIOS of claim 10, wherein the program instructions, upon execution by the processor, further cause the IHS to:
allow a user to manually change the automatically entered data.

12. The BIOS of claim 10, wherein the prefill data includes system identification information and configuration data.

13. The BIOS of claim 12, wherein the configuration data includes at least one of: Management Engine (ME) stock keeping unit (SKU) selection, Platform Controller Hub (PCH) SKU selection, customer purchase selections, or BIOS Setup Information.

14. The BIOS of claim 13, wherein to validate the prefill data, the program instructions, upon execution by the processor, further cause the IHS to: (i) compare a system ID of the motherboard with a system ID stored as part of the prefill data in the selected memory device; (ii) compare an Extended Display Identification Data (EDID) serial number with an EDID serial number stored as part of the prefill data in the selected memory device; (iii) compare power supply identification information with power supply identification information stored as part of the prefill data in the selected memory device; or (iv) compare a dual in-line memory module (DIMM) serial number with a DIMM serial number stored as part of the prefill data in the selected memory device.

15. The BIOS of claim 10, wherein the program instructions, upon execution by the processor, further cause the IHS to:
select the one of the two or more memory devices to retrieve the prefill data from based upon a priority score.

16. The BIOS of claim 15, wherein the priority score is based upon: (i) a speed of a data transfer between each of the two or more memory devices and the processor; (ii) a previous successful boot indication associated with the prefill data in each of the two or more memory devices; or (iii) a modification date associated with the prefill data in each of the two or more memory devices.

17. In an Information Handling System (IHS), a method comprising:
entering a BIOS service menu while operating in a service mode;

determining that prefill data is available in two or more memory devices;

retrieving the prefill data from a selected one of the two or more memory devices;

validating the prefill data; and using the validated prefill data to automatically enter data into corresponding fields of the service menu.

18. The method of claim 17, wherein the prefill data includes system identification information and configuration data, wherein the system identification information includes a service tag, and wherein the configuration data includes at least one of: Management Engine (ME) stock keeping unit (SKU) selection, Platform Controller Hub (PCH) SKU selection, customer purchase selections, or BIOS Setup Information.

19. The method of claim 18, further comprising comparing: (i) a system ID of a motherboard with a system ID stored as part of the prefill data; (ii) an Extended Display Identification Data (EDID) serial number with an EDID serial number stored as part of the prefill data; (iii) power supply identification information with power supply identification information stored as part of the prefill data; or (iv) a dual in-line memory module (DIMM) serial number with a DIMM serial number stored as part of the prefill data.

* * * * *